April 16, 1963 C. W. MAGNUSON 3,085,677
CUT-SIZE PAPER HANDLING MACHINE
Filed July 30, 1959 12 Sheets-Sheet 1

FIG.1

INVENTOR.
CARL W. MAGNUSON
BY
ATTORNEYS

INVENTOR.
CARL W. MAGNUSON

April 16, 1963 C. W. MAGNUSON 3,085,677
CUT-SIZE PAPER HANDLING MACHINE
Filed July 30, 1959 12 Sheets-Sheet 4

INVENTOR.
CARL W. MAGNUSON
BY
ATTORNEYS

April 16, 1963  C. W. MAGNUSON  3,085,677
CUT-SIZE PAPER HANDLING MACHINE
Filed July 30, 1959  12 Sheets-Sheet 5

INVENTOR.
CARL W. MAGNUSON
BY
ATTORNEYS

FIG. 9

INVENTOR.
CARL W. MAGNUSON

April 16, 1963 C. W. MAGNUSON 3,085,677
CUT-SIZE PAPER HANDLING MACHINE
Filed July 30, 1959 12 Sheets-Sheet 7

INVENTOR.
CARL W. MAGNUSON
BY
ATTORNEYS

*INVENTOR.*
CARL W. MAGNUSON
BY
ATTORNEYS

United States Patent Office 3,085,677
Patented Apr. 16, 1963

3,085,677
CUT-SIZE PAPER HANDLING MACHINE
Carl W. Magnuson, Port Edwards, Wis., assignor to Nekoosa-Edwards Paper Company, Port Edwards, Wis., a corporation of Wisconsin
Filed July 30, 1959, Ser. No. 830,596
9 Claims. (Cl. 198—211)

This invention relates to improvements in machines for handling paper and the like.

A principal object of the invention is to provide a novel and improved form of apparatus for straightening and inverting blocks of cut-size paper and separating the blocks of paper into individual reams.

A further object of the invention is to provide an improved form of paper handling device in the form of a pocketed wheel, receiving blocks of paper from a trimmer and the like, and straightening, inverting and transferring the blocks of paper for further operations thereon.

A still further object of the invention is to provide a novel form of transfer device for blocks of paper and the like in the form of a transfer wheel having a plurality of generally radially extending pockets therein for receiving blocks of trimmed paper, in which motor driven means are provided for rotating the wheel in steps of 90° for turning the blocks of paper to vertical positions for jogging or straightening the same and inverting the blocks of paper to horizontal positions, in which an individual ejector is provided for each pocket and in which a novel and simplified form of drive means is provided for the ejectors effective only when a pocket is in a horizontal discharge position.

These and other objects of the invention will appear from time to time as the following specification proceeds and with reference to the accompanying drawings wherein.

Figure 1:
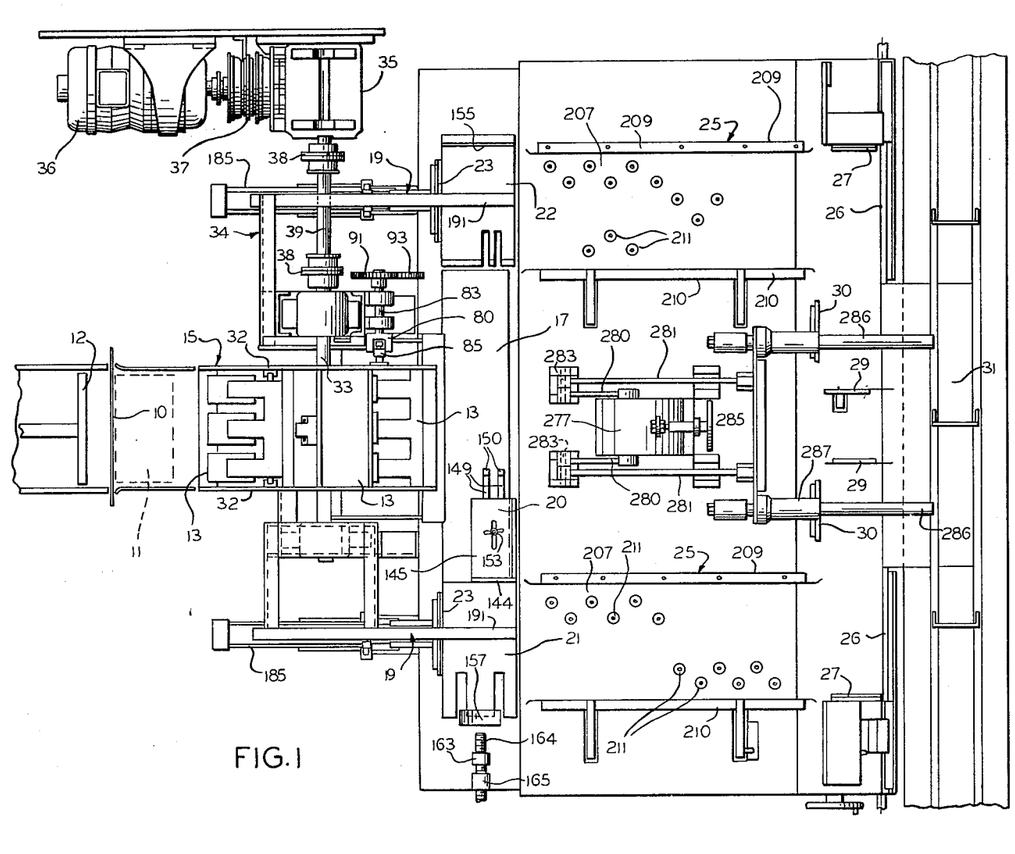
FIGURE 1 is a top plan view of a paper handling machine constructed in accordance with the invention.

In the embodiment of the invention illustrated in the drawings, I have diagrammatically shown in FIGURE 1 a trimmer blade 10 for trimming a block of paper 11. I have also diagrammatically shown a pusher 12 pushing the block of paper into a pocket 13 of a paper straightening, inverting and transfer wheel 15 shown in FIGURE 2.

The pocket 13 has an ejector plate 16 therein, movable outwardly therealong to eject the straightened and inverted block of paper onto a transfer table 17, having a ream splitter 19 at each end thereof.

A transfer car 20 moves the blocks of paper along the transfer table 17 in either direction onto elevating platforms 21 or 22 of the ream splitters 19. The table and elevating platforms are elevated in two stages to accommodate pusher plates 23 of the ream splitters 19, to first push a portion of the block of paper onto a magazine 25 and then push the remaining portion of the block of paper onto said magazine, splitting the block of paper into two reams of equal size.

The magazines 25 serve as storage magazines and accommodate the paper to move downwardly therealong into engagement with fences 26 spaced from the discharge ends thereof, from which the reams are moved laterally by magazine ejectors 27, into engagement with spaced fences 29 extending longitudinally of the machine. Pushers 30 then push the reams of paper onto a conveyor 31, for wrapping.

Referring now in particular to the paper inverting, straightening and transfer wheel 15, said transfer wheel 15 is shown in FIGURES 1 through 8 as including two laterally spaced, connected circular disks or plates 32 forming side plates for the wheel and having the pockets 13 mounted therebetween. The wheel 15 is keyed or otherwise secured to a transverse drive shaft 33 suitably journalled in a main frame 34 for the machine, and driven by an indexing drive device 35.

The indexing drive device 35 may be of a type having a long interval of dwell with a positive lock in each indexing position, such as the model TPA–4 "Ferguson drive" manufactured by Ferguson Machine Corporation of Indiana, and no part of the present invention so not herein shown or described in detail. The indexing drive device is driven by a motor 36, which may be a well known form of gear motor having reduction gearing contained in the casing thereof. The motor 36 drives the indexing device 35 through a one revolution clutch and brake unit 37, which also may be a well known form of electric clutch and brake unit, and no part of the present invention so not herein shown or described further.

The drive shaft 33 is driven step by step by the indexing device 35 through spaced couplings 38 and a connecting shaft 39. The motor 36 and one revolution clutch and brake unit 37 may be energized under the control of the pusher 12, to index the wheel 15, to bring an empty pocket 13 into receiving relation with respect to the cutter 10, a next preceding pocket 13 into an upright jogging or straightening position and a third pocket 13 into a horizontal discharge position, in position to discharge a block of paper onto the transfer table 17.

Figure 2:
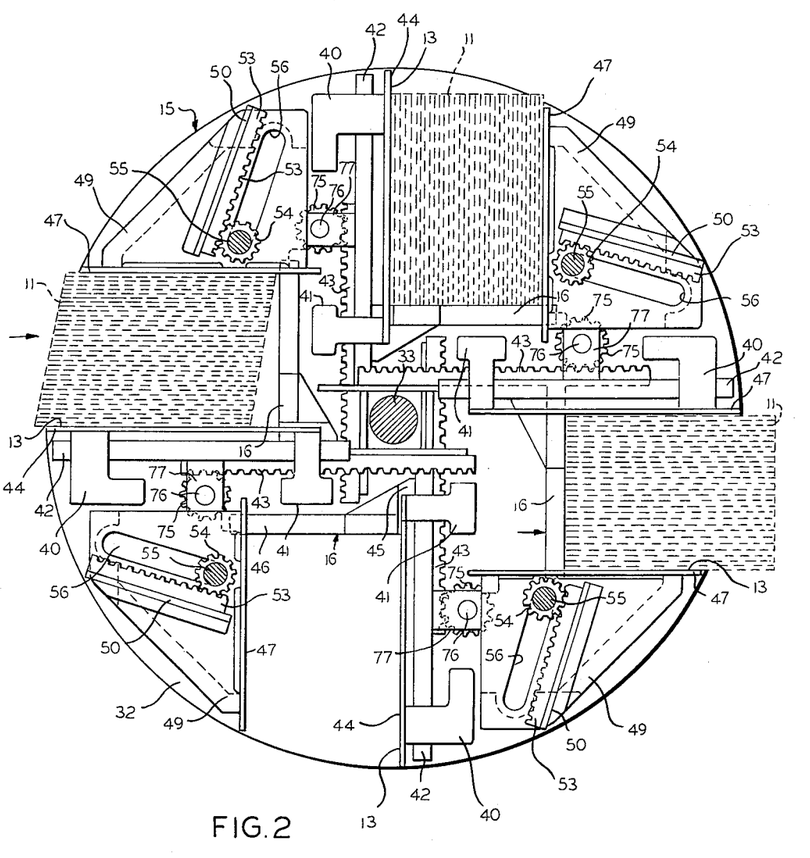
FIGURE 2 is a view in side elevation of a ream straightening and transfer wheel constructed in accordance with the invention, with one of the end plates therefor removed and with certain parts shown in vertical section.

Between the plates 32 are mounted a plurality of chordal guides 40 and 41 and ways 42 extending along said guides and forming guides for racks 43 for actuating the pushers 16. The chordal guides 40 and 41 have spaced plates 44 mounted thereon and forming one wall or vane of each pocket 13. The space between said plates 44 forms a slot or guide for a tongue 45, extending from the pusher 16 and suitably secured to an associated rack 43. The pusher 16 has spaced fingers 46, guided between spaced plates 47 and forming an advance wall or vane of the pocket 13, spaced in advance of the plates 44 of said pocket. The plates 47 are mounted on the inner end of an adjustable bracket or support 49, which may be a casting and is shown in FIGURE 2 as being generally triangular in end view.

The adjustable support or bracket 49 has guide strips or ribs 50 extending from opposite sides thereof, guided within channeled guides 51 mounted on the insides of the plates 32 and inclined upwardly with respect to a horizontal diametrical line extending through the center of the wheel 15, and guiding the support 49 and plates 47 for parallel movement with respect to the plates 44, and thereby accommodating the pockets 13 to be adjusted for various thicknesses of paper.

Adjustment of the plates 47 is attained by racks 53 extending along the guide strips or ribs 50 along the inner sides thereof, and meshing with pinions 54 on transverse shafts 55. The transverse shafts 55 extend through slots 56 formed in the support or bracket 49, extending parallel to the guide ribs 50 and the racks 53, and are suitably journaled in the end plates 32 of the wheel 15.

Figure 3:
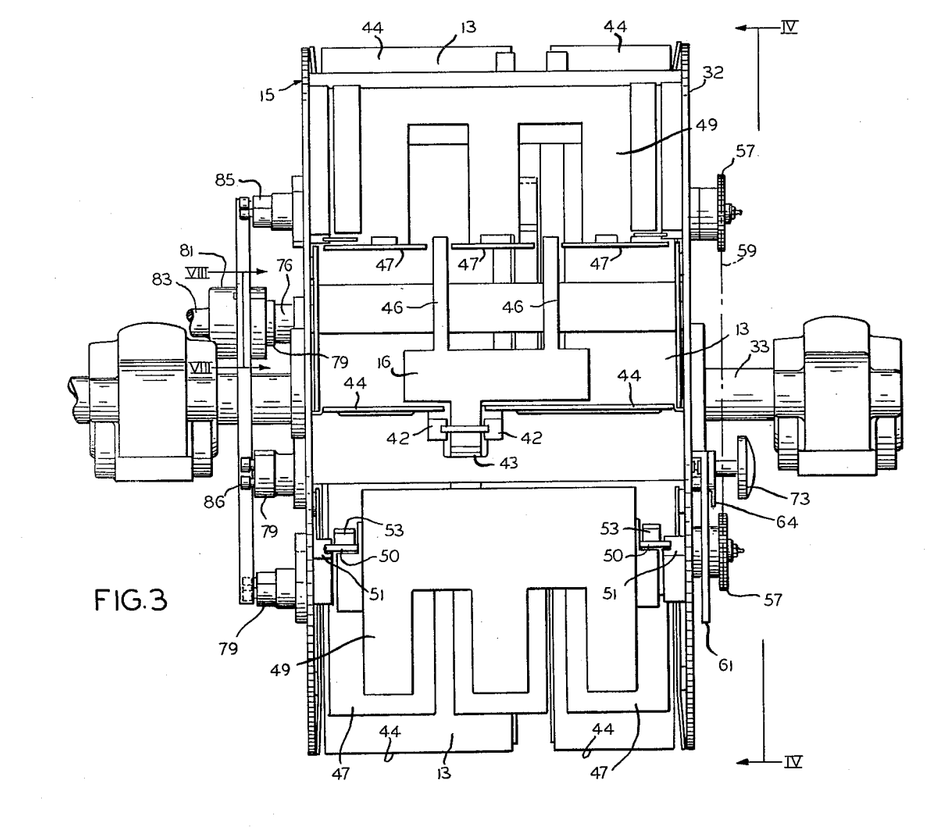
FIGURE 3 is a view in end elevation of the ream transfer wheel shown in FIGURE 2.
Figure 4:
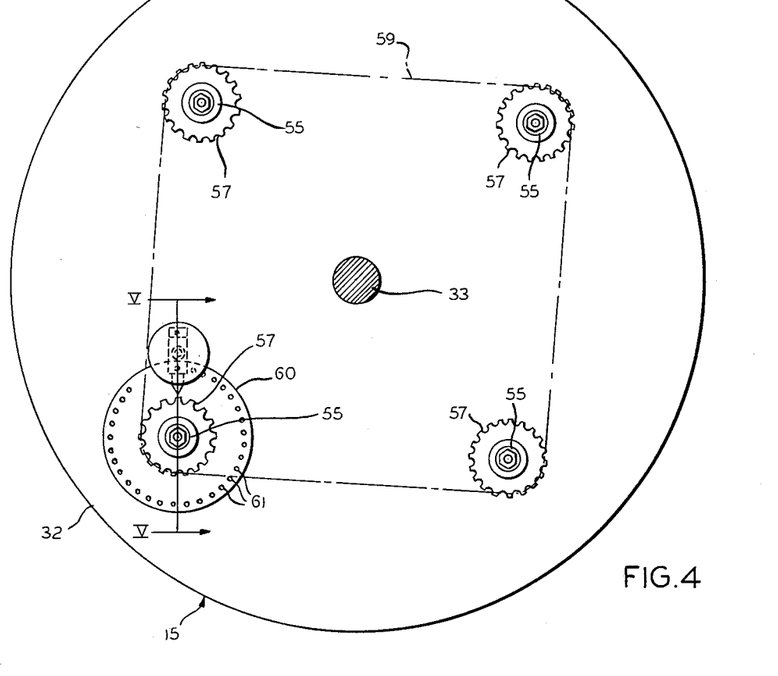
FIGURE 4 is a side view of the ream straightening and transfer wheel shown in FIGURES 2 and 3 looking substantially along line IV—IV of FIGURE 3, and showing the means for adjusting the pockets in accordance with the size and grade of paper.
Figure 5:
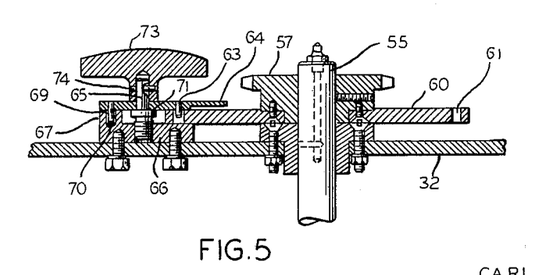
FIGURE 5 is a fragmentary sectional view taken substantially along line V—V of FIGURE 4.

The shafts 55 extend outside of one end plate 32, which in FIGURE 3 is shown as being the opposite end plate from the mechanism for driving said wheel. Sprockets 57 are keyed or otherwise secured to the ends of the shaft 55 and mesh with an endless chain 59 (see FIGURE 4).

A dial disk or plate 60 is shown as being secured to the hub of one sprocket 57, and as extending radially outwardly therefrom. The dial 60 has a plurality of apertures 61 extending therethrough, corresponding to different weights and thicknesses of blocks of paper, and selectively engaged by a pin 63, extending inwardly of a pointer 64. Said pointer 64 is mounted on a shaft 65, threaded within a support 66, suitably secured to the outside of the end plate 32. The support 66 has a lug 67 extending outwardly therefrom, having a recess 69 therein, adapted to be engaged by a locking pin 70. The shaft 65 has a collar 71 formed integrally therewith, abutting the underside of the pointer 64. The outer side of the pointer 64 is abutted by the hub of a hand knob 73. The hand knob 73 is secured to the shaft 65 as by a pin 74.

Thus, when it is desired to change the width of the pockets 13, it is merely necessary to turn the hand knob 73 a distance sufficient to bring the pin 63 out of one of the apertures 61. The disk 60 may then be turned to the correct position, which may be determined by indicia (not shown) on the face of said disk, registrable with the pointer 64. The hand knob may then be turned in an opposite direction, to engage the pin 63 with the required aperture 61, and thereby hold the disk 60 from rotation.

Figure 7:
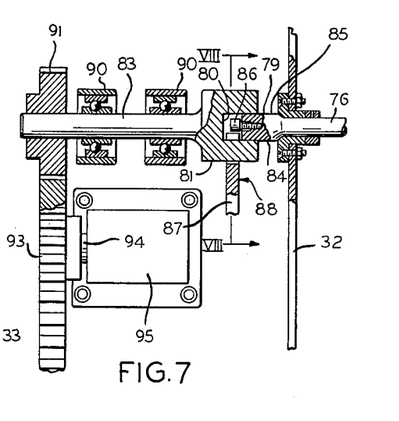
FIGURE 7 is a fragmentary sectional view taken substantially along line VII—VII of FIGURE 6, and showing certain other details of the ejector drive not shown in FIGURE 6.
Figure 8:
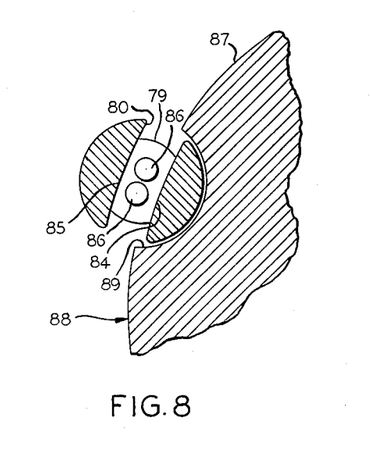
FIGURE 8 is a fragmentary sectional view taken substantially along line VIII—VIII of FIGURE 3, and showing still other details of the ejector drive not shown in FIGURES 6 and 7.

The racks 43 for actuating the pushers 16 are meshed with pinions 75 on transverse shafts 76. Each shaft 76 is journaled at one end on bearing supports 77 extending along opposite sides of the associated pinion 75, and mounted on a fixed way 42 for the rack 43. The shafts 76 as shown in FIGURE 7, extend outwardly of an end plate 32 and are suitably journaled therein, and have a drive member 79 on the end thereof, extending within a driving socket 80 in an enlarged inner end portion 81 of a drive shaft 83. The drive member 79 has opposite walls 84 and 85 conforming to arcs struck from radii extending through the center of rotation of the wheel 15, and conforming to opposite inner walls of the drive socket 80. The drive socket 80 opens to opposite sides thereof to receive the drive member 79, each time the wheel 15 is indexed to move the pocket 13 associated with said drive member into a paper block transferring position. The drive member 79 is maintained in position to enter the drive socket 80 by two spaced followers 86 on the end of said drive member, and riding along a circular camming face 87 of a cam disk 88 (FIGURES 7 and 8). The cam disk has a recessed portion 89 for receiving the drive socket 80.

It should here be understood that after an ejector 16 has been moved outwardly to an ejecting position, and has then been returned to its innermost position, that as the wheel 15 is rotatably driven by the motor 36, to be indexed to a next succeeding paper block transferring position, that the drive socket 80 is stopped in position to receive a next succeeding drive member 79 by holding pressure on a drive motor 95, rotatably driving said socket, as will hereinafter more clearly appear as this specification proceeds. The cam followers 86, riding along the camming face 87 of the disk 88 will maintain the drive members 79 in position to engage within the socket 80 each complete cycle of rotation thereof, it being understood that when one drive member 79 leaves a socket 80, that the next succeeding drive member will be cammed into position to enter said socket and will enter said socket to be driven therefrom when the wheel 15 has been indexed to a paper block transferring position.

The shaft 83 is shown in FIGURE 7 as being journaled in spaced bearings 90 and as having a spur gear 91 keyed or otherwise secured to the end thereof. The spur gear 91 in turn meshes with a spur gear 93 keyed or otherwise secured to a motor shaft 94, of the motor 95.

The motor 95 may be a reversible fluid operated motor, such as an air motor and is driven in one direction to move the ejector 16 outwardly to eject a block of paper from an associated pocket 13, and is then reversed to move the ejector 16 to its innermost position within an associated pocket 13.

The supply of fluid under pressure to the motor 95 may be under the control of a solenoid operated valve 96 (FIGURE 22) operable to effect rotation of the motor 95 in a direction to move the ejector 16 outwardly of the pocket as the wheel 15 moves into a transfer position, and reversing the direction of rotation of the motor 95 as the block of paper is discharged onto the transfer table 17.

Figure 6:
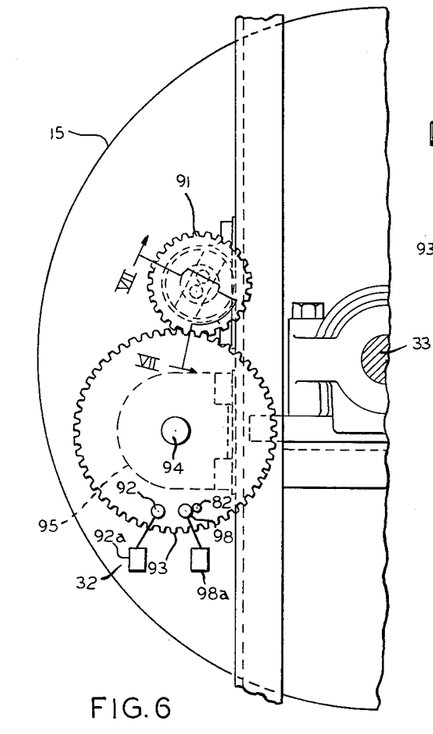
FIGURE 6 is a fragmentary end view of the transfer wheel looking at the opposite end thereof from FIGURE 4, and showing certain details of the drive to the ejectors for the transfer wheel pockets.

As shown in FIGURE 6 a stop 82 projects axially of the gear 93 and engages a switch arm 92 of a switch 92a, actuating the valve 96 to reverse the direction of the motor 95 when the ejector 16 has been moved to its extreme outward position. The gear 93 will then be rotated to engage a switch arm 98 of a switch 98a. This will actuate the valve 96 to stop rotation of the motor 95 when the ejector is in its extreme inner position. Pressure on the motor 95 then holds the socket 80 in position to receive a next succeeding drive member 79.

The transfer table 17, as shown in FIGURES 1, 9, 10 and 11, is mounted on a frame structure 100 extending transversely of the main frame 34 for the machine and adjustably mounted on the upper ends of two laterally spaced screw jacks 130. Vertical adjustment of the transfer table 17 to align the transfer table with an adjustable bottom plate 47 of a pocket 13, when said pocket is in a discharge position is attained by means of the laterally spaced screw jacks 130. The screw jacks 130 are mounted on platforms 131, supported on the main frame structure 34 for the machine. A hand crank 133 on one side of the machine is provided to operate the screw jacks 130 through a shaft 135, a coupling 136, a coupling shaft 137 and couplings 139 at opposite ends thereof, coupling the screw jacks together. The screw jacks 130 may be of any well known form, and are no part of the present invention so need not herein be shown or described in detail.

Figure 9:
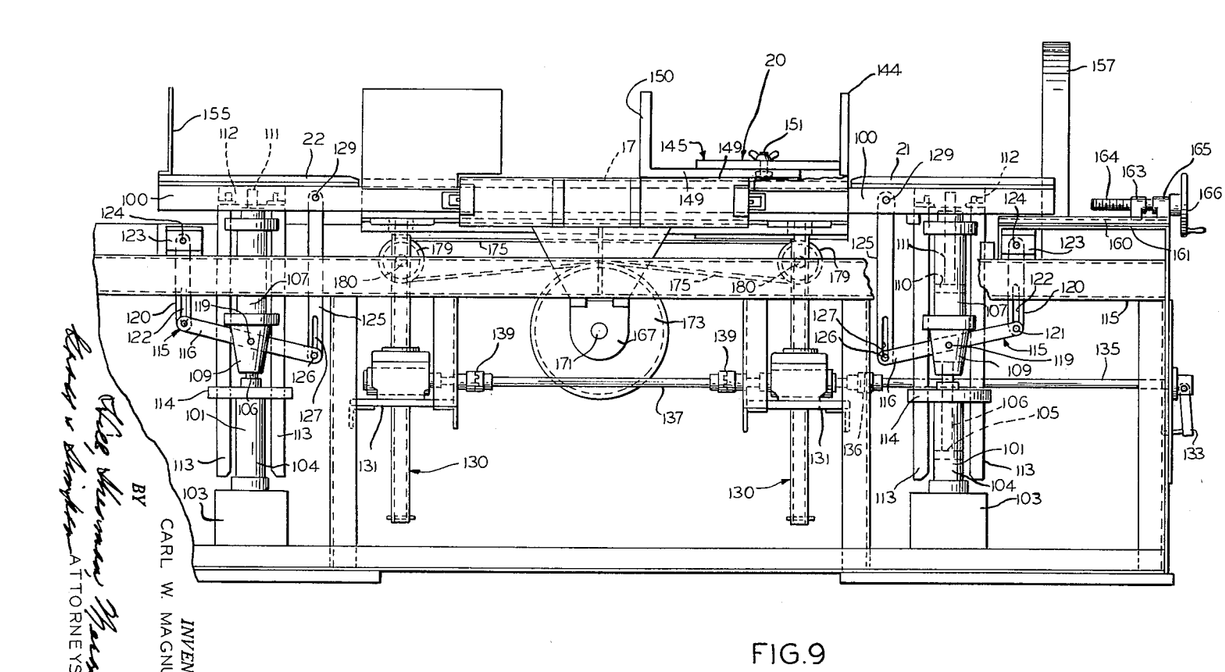
FIGURE 9 is a fragmentary front end view of the machine with the transfer wheel and certain other parts removed in order to illustrate certain details of the elevator for the blocks of paper.

The two elevating platforms 21 and 22 at opposite ends of the transfer table 17 are mounted on individual two stage fluid operated jacks 101 for individually elevating the elevator platforms 21 and 22 in two stages as blocks of paper are alternately deposited thereon by the transfer car 20. As shown in FIGURE 9, the two stage jacks 101 are mounted on bases 103, adjacent opposite ends of the frame structure 100.

Each two stage jack 101 includes a lower cylinder 104 having a piston 105 movable therealong and having a piston rod 106 extending therefrom and extensible from the cylinder 104. A fluid cylinder 107 is mounted on the end of the piston rod 106 on top of the cylinder 104 on a depending head 109, mounted on the upper end of the piston rod 106. The cylinder 107 has a piston 110 movable therealong having a piston rod 111 extending therefrom and extensible from the piston rod end of the cylinder 107. The piston rod 111 is mounted in a cap 112, abutting the bottom of an elevator platform 21. Spaced elevator guides 113 extending downwardly from the cap 112 along opposite sides of the cylinders 104 and 107 and within a retainer 114, mounted on and spaced outwardly of the cylinder 104.

An adjustment leverage arrangement 115 is provided for adjusting the position of the cylinder 107 in accordance with position of adjustment of the transfer table 17 and the thickness of the ream to be split, to cause the piston rod 111 to raise the associated elevator platform a distance equal to the distance from the top of the stack of sheets to the plane of the magazine 25 plus half the thickness of the stack of sheets during the first stage of elevation of the transfer table 17. The adjustment leverage arrangement 115 includes a lever 116 extending through a slot 117 in the head 109 and pivotally connected to the head 109 intermediate its ends, on a horizontal pivot pin 119.

The outer end of the lever 116 is pivotally connected to a pivot link 120 by a pivot pin 121 extending within a slot 122 extending upwardly along said link. The link 120 in turn is pivotally connected to a support 123 on a pivot pin 124. The support 123 is stationary and is mounted on the main frame 34. The opposite end of the lever 116 is pivotally connected to a link 125 on a pivot pin 126 extending within a slot 127 extending upwardly along said link. The link 125 is pivotally connected at its upper end to the frame structure 100 on a pivot pin 129 and moves vertically upon vertical adjustment of the frame structure 100 and transfer table 17.

When it is desired to elevate either of the elevator platforms 21 and 22, fluid under pressure is admitted to the head end of the associated cylinder 107 under the control of an associated valve 294. This will extend the piston rod 111 with respect to said cylinder and lift the elevator platform for the adjusted length of stroke of the piston rod 111 adjusted in accordance with the position of adjustment of the transfer table 17, and the thickness of the block of paper thereon.

At the end of the forward stroke of the piston rod 111, the cylinder 107 will have moved upwardly a distance equal to the distance from the top sheet of the block of paper to the plane of the magazine plus one-half the thickness of the block of paper on the elevator platform. The elevator platform will then be in position to accommodate the associated ream splitter pusher 23 to divide a block of paper into a ream, and to push the ream onto an associated magazine 25.

After the pushing of the ream onto the magazine 25, fluid under pressure will be admitted to the head end of the associated cylinder 104 under the control of the associated valve 299, to elevate the piston 105 and the piston rod 106 raising the cylinder 107 and associated elevator platforms to the level of the receiving ends of the associated magazines 25 to accommodate the associated ream splitter pusher 23 to push a ream of paper onto the associated magazine.

Figures 11, 12:
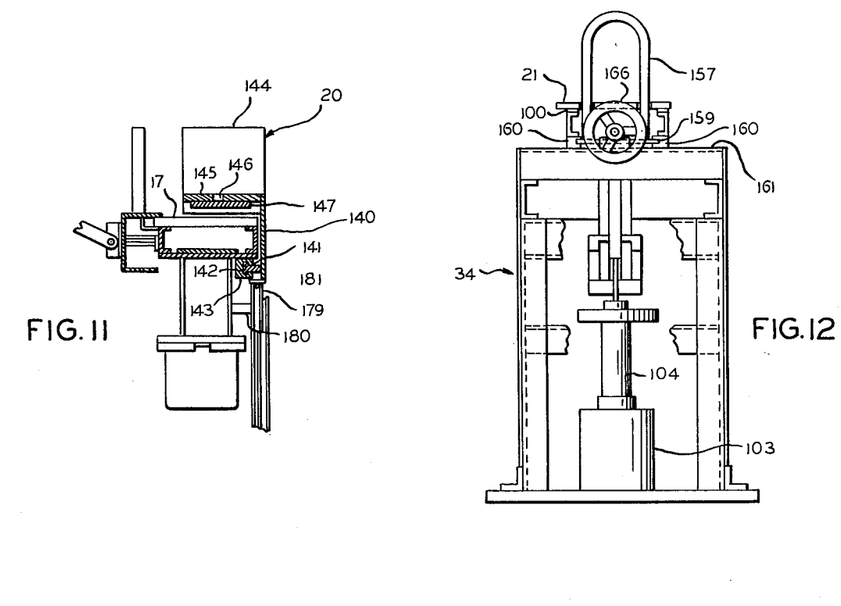
FIGURE 11 is a fragmentary vertical sectional view taken substantially along line XI—XI of FIGURE 10.
FIGURE 12 is a fragmentary end view of the transfer table and elevator.
Figure 13:
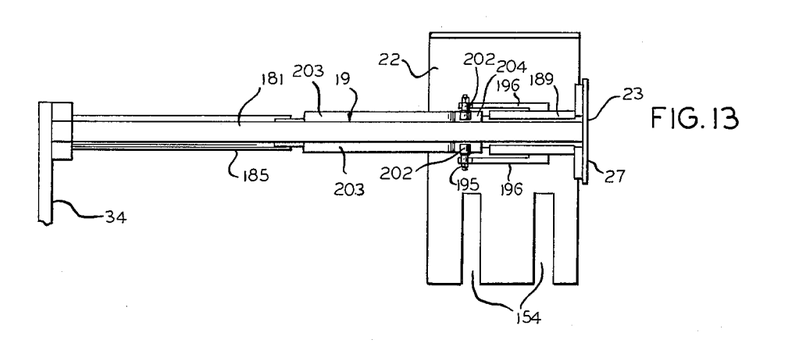
FIGURE 13 is a fragmentary plan view of the ream splitter with certain parts of the apparatus broken away.

The transfer car 20, for transferring a block of paper along the table 17 to either of the elevator platforms 21 or 22, includes a pusher arm or plate 140 extending upwardly of the top of the transfer table 17 and downwardly beneath the support structure for said table. The pusher arm or plate 140 has a rail 141 extending inwardly therefrom having a T-shaped head engageable within a T-slot 142, mounted in a guide bar 143 mounted on the bottom of the frame structure 100 and extending therealong (FIGURE 11). The plate 140 has a pusher plate 144 extending inwardly of one end thereof along the top of the table 17, and has an inwardly extending plate 145 extending parallel to the top of the table and having a slot 146 extending therealong. The slot 146 forms an adjustable mounting for an adjustable pusher 147, extending beneath the plate 145 and having parallel arms 149 extending therefrom having upright pusher end portions 150. The adjustable pusher 147 is adjustably secured to the plate 145 as by a bolt 151 extending upwardly through the slot 146 and having a wing nut 153 threaded thereon.

The pusher plate 144 thus pushes a block of paper along the transfer table 17 onto the elevator 21 upon movement of the transfer car along the transfer table 17 in one direction, while the adjustable pusher arms 150 push a block of paper along the transfer table 17 onto the elevator platform 22 upon the reversal in the direction of travel of the transfer car 20.

Figure 10:
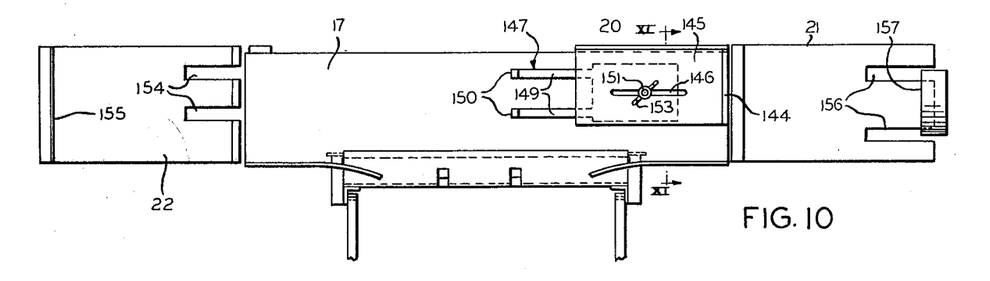
FIGURE 10 is an enlarged fragmentary plan view showing the transfer table, transfer car and elevating tables for the blocks of paper.

It will be noted from FIGURE 10 that the pusher arms 149 and upright pusher end portions 150 thereof move into parallel spaced slots 154 in the elevator plate 22, to accommodate the transfer car to push a block of paper into engagement with a stop plate 155 at the outer end thereof.

The elevator plate 21 is provided with parallel slots 156 extending inwardly from the outer end thereof, forming guides for the legs of a generally U-shaped stop 157. The U-shaped stop 157 extends upwardly from a plate 159 guided in gibbed guides 160, extending along an end platform 161 mounted on the top of the main frame 34 for the machine (FIGURE 9). A nut 163 extends outwardly from the plate 159 and has an adjustment screw 164 threaded therein. The adjustment screw 164 is rotatably mounted in a bearing boss 165 extending upwardly from the end platform 161 and is suitably retained from axial movement with respect to said bearing boss. A wheel 166 on the outer end of the adjustment screw 164 is provided to adjust the stop in accordance with the length of paper being split into reams. It should here be noted that since the pusher arms 149 and pusher end portions 150 move within the slots 154 and are adjustably movable with respect to the plate 145, and since the stops 157 are adjustable, that the transfer car may push blocks of paper onto and along either platform 21 or 22 to the stops on the outer ends thereof, without changing the length of travel of said transfer car.

Figure 22:
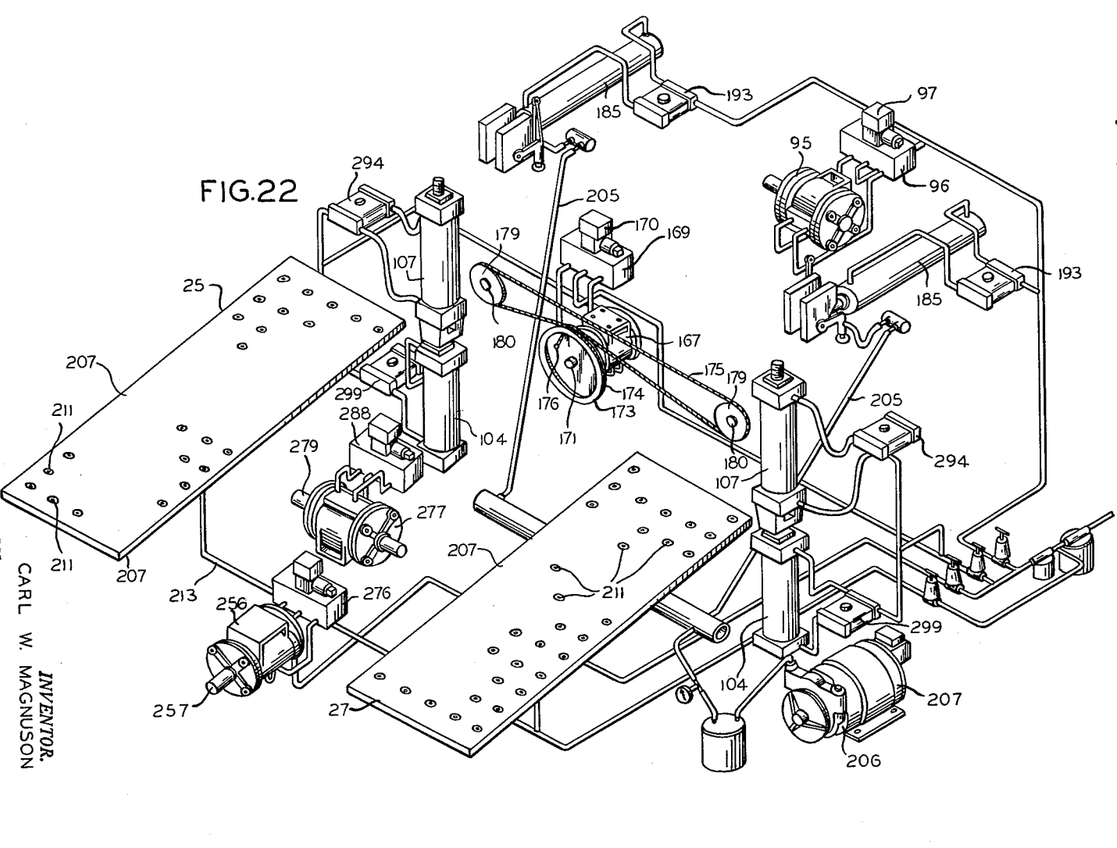
FIGURE 22 is a diagrammatic view diagrammatically showing the fluid pressure operating devices and control connections thereto for controlling certain operations of the machine.

A reversible fluid operated motor 167 is provided to move the transfer car 20 along the transfer table 17 in opposite directions. Operation of the motor is shown in FIGURE 22 as being controlled by a solenoid operated valve, generally indicated by reference character 169. The motor 167 has a motor shaft 171 having a pulley 173 on the end thereof. The pulley 173 has spaced grooves 174 in the face thereof about which are trained opposite end portions of a flexible cable 175. One end portion of the flexible cable 175 is secured to the outer side of the pulley 173 as indicated by reference character 176. The opposite end portion of the cable 175 is secured to the inner side of the pulley 173 in a similar manner (not shown). The flexible cable 173 is trained about laterally spaced sheaves 179, mounted on the back of the elevating frame structure 100, on shafts 180. The cable 175 is shown in FIGURE 11 as being secured to a lip 181 extending inwardly of the pusher arm or plate 140 to reversely move the pusher arm or plate 140 along the transfer table 17 in accordance with the direction of rotation of the motor 167.

Referring now in particular to FIGURES 1, 13, 14 and 15 and the ream splitters 19, said ream splitters are each of a similar construction so one only need herein be shown and described in detail. Each ream splitter 19 includes a support bar 181 supported at its rear end on the main frame 34 for the machine, and extending over the elevator platform 21 longitudinally of the magazine 25 and terminating at said magazine. The support bar 181 has spaced bracket 184 depending from the rear end portion thereof, forming a support for a double acting fluid operated cylinder 185. The cylinder 185 has a piston rod 186 extensible therefrom, extending within a connector 187, extending rearwardly of a slide 189 forming a support for the pusher plate 23. The slide 189 has gibbed guides 190 slidably engaging opposite sides of a guide plate 191. Fluid under pressure, such as air, is admitted to the head or piston rod end of the cylinder 185 under the control of a solenoid controlled valve 193, operated to admit fluid under pressure to the head end of the cylinder 185 as a block of paper is on an associated elevator platform and is elevated into position by the elevator platform to be split by operation of the associated ream splitter 19, and to admit fluid under pressure to the piston rod end of the cylinder 185, to return the slide 189 and pusher 23, at the end of the forward stroke of the piston rod 186.

The slide 189 forms a connector for laterally spaced slip sheet removers 195 at each side of the support bar 181. The slip sheet removers 195 have arms 196 extending forwardly therefrom pivotally connected to the outer sides of the slide 189 on pivot pins 197. The slip sheet removers 195 have hollow lower end portions 199 having suction cups 200 on the lower ends thereof, in communication with the hollow interiors of the hollow lower end portions 199. Support arms 201 extend upwardly of the hollow end portions 199 and have follower rollers 202 on the upper ends thereof riding along cams 203, secured to opposite sides of the support bar 181 and extending therealong. The cams 203 form slidable supports for the slip sheet removers 195, and have low portions 204 at the forward ends thereof, accommodating the suction cups 200 to drop onto the slip sheet of the ream, as the pusher 23 reaches the end of its forward stroke, and pushes a ream onto the magazine 25, to pick-up the slip sheet from the ream and remove the slip sheet upon return travel of the pusher 23 and return movement of the follower rollers 202 along the cam 203. The hollow interior portions of the slip sheet removers 195 on each side of the machine have connection with a source of vacuum through vacuum lines 205. The vacuum lines 205 are connected with a vacuum pump 206, driven by a motor 207.

Figures 16, 17, 18, 19:
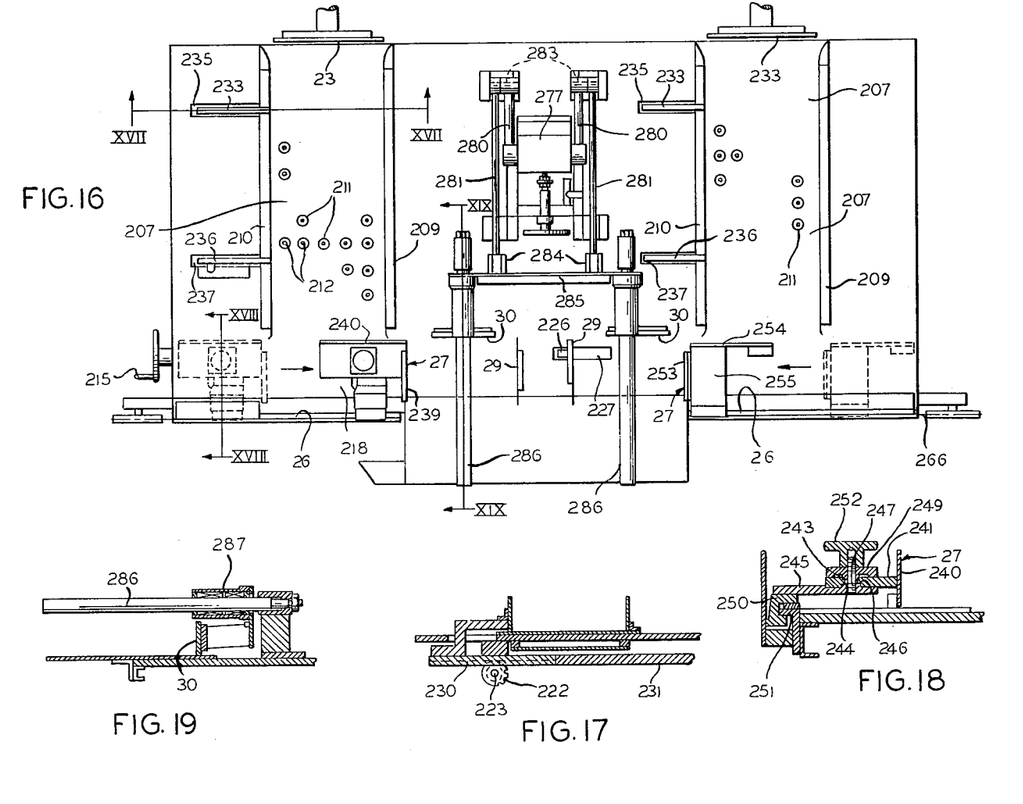
FIGURE 16 is a plan view of the forward end portion of the machine showing the storage magazines, ejectors for ejecting reams of paper from the storage magazines, and the pushers for pushing the ejected reams of paper for further operations.
FIGURE 17 is a fragmentary sectional view taken substantially along line XVII—XVII of FIGURE 16 and showing certain details of the adjusting means, for adjusting the width of the storage magazine.
FIGURE 18 is a sectional view taken substantially along line XVIII—XVIII of FIGURE 16 and showing certain details of one of the ejectors for ejecting reams of paper from the storage magazine.
FIGURE 19 is a fragmentary sectional view taken substantially along line XIX—XIX of FIGURE 16 and showing certain details of one of the pushers, for pushing ejected reams of paper for transfer for further operations thereon.
Figure 23:
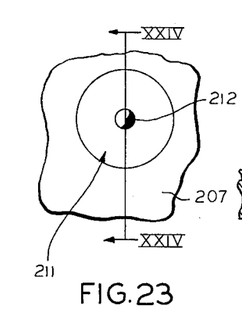
FIGURE 23 is a fragmentary plan view of the magazine illustrating one of the air valves in the bottom plate of the magazine.
Figure 24:
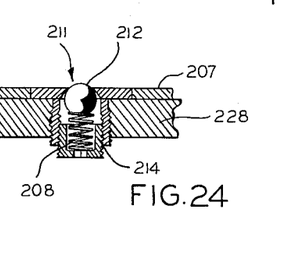
FIGURE 24 is a fragmentary sectional view taken substantially along line XXIV—XXIV of FIGURE 23.

Each magazine 25 as shown in FIGURES 1, 16 and 22 includes an inclined bottom plate 207, and fixed and adjustable fences 209 and 210 respectively, extending along the sides thereof and forming side walls for the magazine. The bottom plate 207 has a plurality of air valves 211 therein, and including balls 212 projecting above the top of the plate 207 and biased into closed positions by springs 208 carried in cages 214 (FIGURES 23 and 24). The cages 214 are threaded in a manifold 228, suitably connected with a source of air under pressure through a pressure line 213. As a ream of paper is pushed onto the magazine 25 by a pusher 23 and rests on the balls 212, the weight of the ream will press the balls inwardly of the top surface of the plate 207, and release air jets. This will provide an air film to float the reams downwardly along the inclined plate 207 and index the end ream into engagement with a fence 26, forming a stop therefor to accommodate the lateral ejection of the ream from the magazine, by the ejector 27, and index the next succeeding reams to follow the end ream, and come into position to be ejected upon ejection of the end ream.

Figure 14:
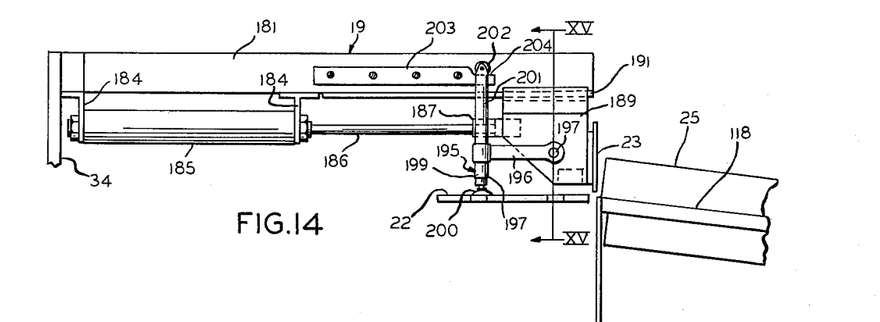
FIGURE 14 is a view in side elevation of the ream splitter shown in FIGURE 13.
Figure 15:
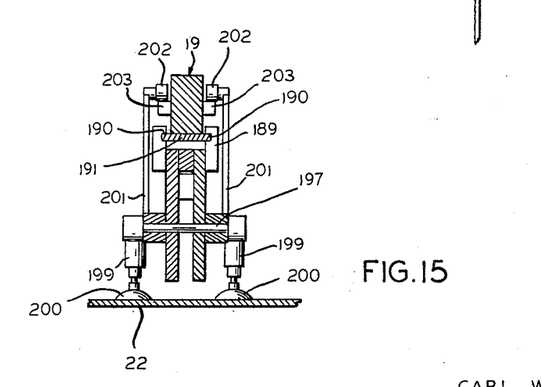
FIGURE 15 is a sectional view taken substantially along line XV—XV of FIGURE 14.

The adjustable fences 210 are adjusted for different lengths of paper by operation of a hand wheel 215 on the end of a transverse threaded shaft 216. The threaded shaft 216 is journaled in bracket member 217, depending from an inclined top plate or table 118, in a bearing support 219. The table 118 is shown in FIGURE 14 as inclined in the plane of the bottom plate 207 of the magazine 25. A nut 220 secured to a rack 221 slidably guided in the bottom of the table top 218 is threaded on the threaded shaft 216. The rack 221 meshes with a pinion 222 (FIGURE 20) mounted on a shaft 223, journaled on the bottom of the table 218 on spaced bearing supports 224. The rack 221 abuts and is secured to a pusher rod 225 extending along the front of the table 222. The pusher rod 225 is connected with a stop 29 through a connector 226 extending through a slot 227.

The shaft 223 has three spaced pinions 222 mounted thereon. The pinion 222 at the front of the machine is driven by the rack 221 and rotatably drives the shaft 223 upon translational movement of the rack 221. The remaining pinions 222 mesh with individual racks 230 connected with pusher bars 231. One pusher bar 231 has spaced connectors 233 mounted thereon and extending through slots 235 in the plate or table 218 and having connection with the adjustable fences 210. The second pusher bar 231 has spaced connectors 236 connected thereto and extending upwardly through slots 237 in the table top 218 and having connection with the fences 210, to effect parallel movement of said fences to take care of different lengths of reams, it being understood that when the fences of the magazine 25 are adjusted, that the adjustable stop 29 is also adjusted a similar amount, to accommodate the ejection of the two reams from the ends of the magazines 25 in a single operation of the ejectors 27.

The ejector 27 on the side of the machine, which is shown in FIGURES 1 and 16 as being the left hand side of the machine, is adjustable in accordance with adjustment of the corresponding fence 210 and the adjustable stop 29, while the opposite ejector 27 is not adjustable, adjustment being attained by adjusting the facing stop plate 29. The adjustable ejector includes a pusher plate 239 and a stop plate 240 extending at right angles to said pusher plate. The pusher plates 239 and stop plates 240 respectively, are mounted on a horizontally extending adjustable plate 241. The adjustable plate 241, has a slot 243 extending therealong and has a channel 244 in communication with said slot. The support plate 241 is partially recessed within a support plate 245 and the channel 244 is guided on a rib 246 on the support plate 245. A threaded rod 247 is threaded within the plate 245 and extends through a slot 243 and has a clamping plate 249 mounted thereon, clamped into engagement with the plate 241, by the turning of a hand knob 252, threaded on the threaded rod 247.

The support plate 245 is mounted on a channel-like support 250, guided for movement along a slide generally indicated by reference character 251. The opposite ejector 27 also has a pusher plate 253 and a stop plate 254 extending at right angles with respect thereto. Said pusher and stop plates are mounted on a support plate 255 guided along the guide 251 (not shown).

Figure 20:
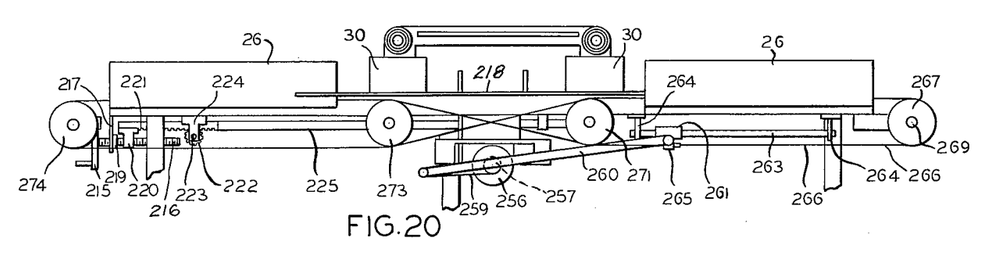
FIGURE 20 is a fragmentary end view of the machine, showing the drive to the magazine ejectors.
Figure 21:
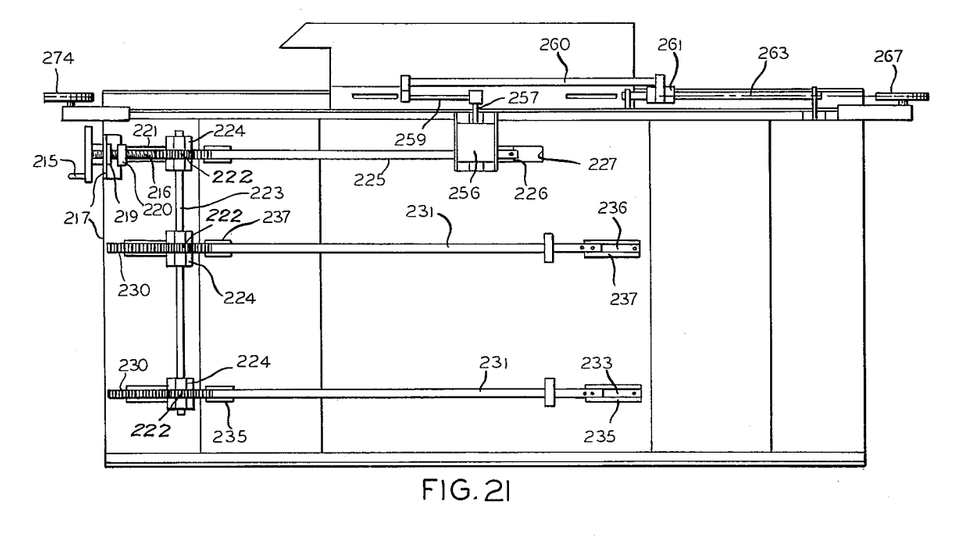
FIGURE 21 is a fragmentary bottom plan view of the forward end portion of the apparatus, with certain parts thereof shown in horizontal section, illustrating the adjusting means for adjusting the magazines for various lengths of paper.

The means for moving the ejectors 27 along the table 218 is shown in FIGURES 20 and 21 as being a fluid operated motor 256 mounted beneath the table top 218 and having a motor shaft 257 having a crank 259 mounted thereon.

The crank 259 has a link 260 pivotally connected to the outer end thereof. The opposite end of the link 260 from the crank 259 is pivotally connected to a slide 261, slidably movable along a rod 263 spaced beneath the table or magazine top 218 and supported on spaced brackets 264, depending from the bottom of said table top. The slide 261 has a clamp 265 depending therefrom, having an endless flexible cable 266 clamped thereto. The cable 266 extends outwardly of the clamp 265 around a sheave 267 spaced outwardly of the table 218 and rotatably mounted on a horizontal shaft 269. The cable 266 turns about the sheave 267 and extends inwardly therefrom and is suitably clamped to the ejector 27, shown in FIGURES 1 and 16 as being the right hand ejector. From the right hand ejector 27 the cable 266 extends toward the left hand ejector over a sheave 271, under a sheave 273 to and around a sheave 274 at the left hand side of the machine and inwardly therefrom to the left hand ejector 27, to which it is suitably clamped. The endless cable 266 extends inwardly of the left hand ejector 27 over the sheave 273 and under the sheave 271 toward the connector 265.

The motor 256 may be operated by air or any other fluid under pressure, under the control of a solenoid operated valve 276, supplying fluid under pressure to said motor to rotate said motor in one direction to move the two ejectors 27 inwardly toward the center of the table to eject two reams of paper, from the magazines 25 and in an opposite direction to return the ejectors 27 to the positions shown in FIGURE 1. It will be noted that the two ejectors 27 move inwardly together and also move on their return strokes together and that the stop plates 240 and 254 of the respective ejectors hold a next succeeding ream from being ejected from the magazines as one ream is being ejected from each magazine.

As the ejectors 27 have ejected reams from the magazines 25 and have moved the reams into engagement with the stop plates 29, the pusher plates 30 will then come into engagement with the two reams, to push the reams off the table 218 onto the conveyor 31. The pusher plates 30 are operated by a reversible fluid operated motor 277, mounted on the top of the table 218 and having a motor shaft 279 extending transversely of said table and extending from each end of the motor housing (FIGURE 22). Crank arms 280 are mounted on the opposite ends of the motor shaft 279 and extend rearwardly of the motor 277, when the pusher plates 30 are in their retracted positions. The crank arms 280 are pivotally connected to links 281 on pivot pins 283. The links 281 extend forwardly of the motor 277 between spaced connectors 284, extending rearwardly of a cross head 285. The cross head 285 is slidably guided on parallel spaced rods 286 extending longitudinally of the table 218 to the conveyor 31, and has generally cylindrical supports 287 extending forwardly therefrom and slidably guided on the rods 286, and having the pusher plates 30 connected thereto. The motor 277 is supplied with fluid under pressure, such as air under the control of a solenoid operated valve 288, operable to operate said motor in one direction to effect movement of the pushers 30 in a pushing direction and to reverse the direction of rotation of said motor to return the pushers 30 to the positions shown in FIGURES 1 and 16.

Figure 25:
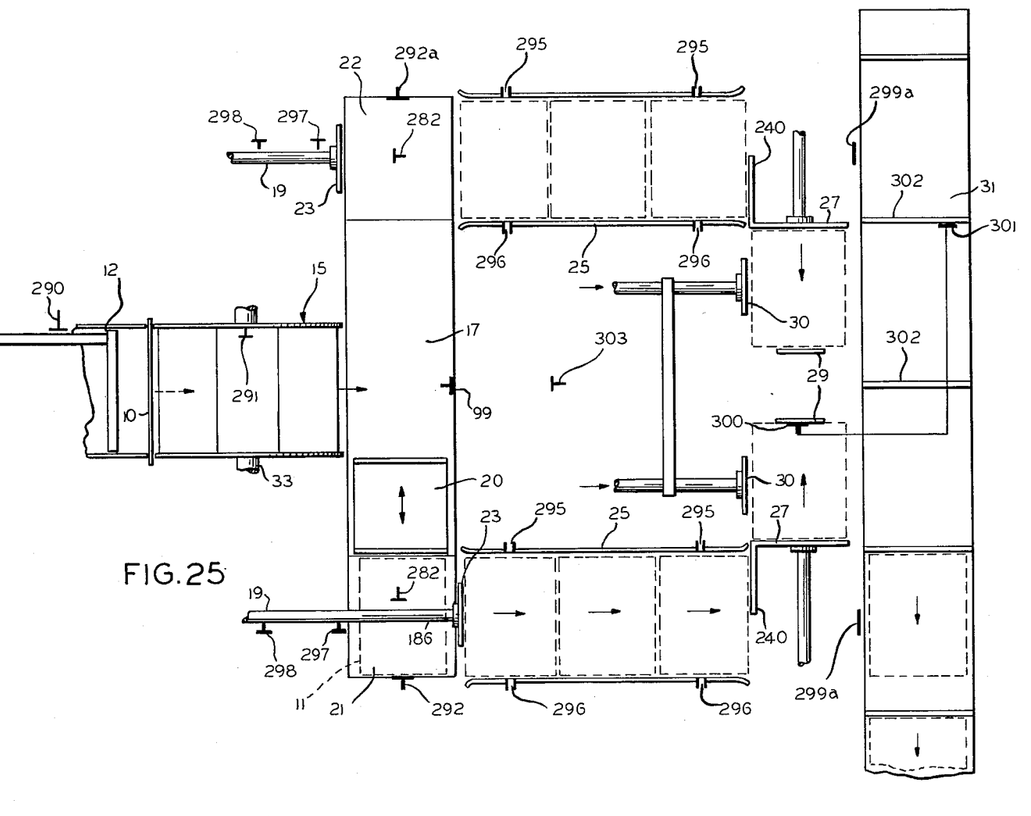
FIGURE 25 is a diagrammatic plan view showing the positions of certain of the limit switches controlling operation of the machine.

Referring now to FIGURES 1, 22 and 25 and the use and operation of the device of the invention, the pusher 12, which may be in the form of a book gage, is manually operated and actuates a switch 290 as it pushes a block of paper to the trimmer knife 10. This will effect indexing of the wheel 15 into position to bring an empty pocket 13 into position to receive a trimmed block of paper. The trimmer knife will then fall. The trimmed block of paper may then be pushed into an empty pocket 13. Indexing of the wheel 15 will also bring a block of paper therein into an upwardly extending jogging position and will bring a next advance block of paper into a horizontal discharge position, to be discharged onto the transfer table 17 by operation of the pusher 16.

As the wheel 15 is indexed to a discharge position, the wheel will close a switch 291 to effect operation of the motor 95 in a direction to operate the ejector 16, to eject a block of paper from said transfer wheel onto the transfer table 17 and to push the block of paper into engagement with a switch 99. This will close the switch 99 and effect operation of the motor 167 in a direction to operate the transfer car 20, to push a block of paper onto either of the elevating platforms 21 or 22, into engagement with the respective switches 292 or 292a associated with the respective elevator platform. This will stop travel of the transfer car 20 and effect operation of a solenoid operated valve 294 to supply fluid under pressure to the head end of an associated cylinder 107, and effect elevation of the associated elevator platform 21 or 22, for a first stage of elevation, and bring the block of paper 11 in position to be split by operation of the ream splitting pusher 23. Elevation of the elevator platform 21 or 22 to a first stage will actuate a switch 282 and supply fluid under pressure through a valve 193 to the head end of the cylinder 185, to effect pushing of half the block of paper onto the magazine 25 along which the paper will be indexed as it is buoyed up by the air film provided by the air jets passing upwardly through the valves 211. Photoelectric cells 295 and sources of light 296 are spaced along the magazines 25 to control movement of the reams therealong and to prevent operation of the ream splitting pusher when the magazine 25 is full of paper.

Upon the ejection of a ream into the magazine 25, a switch 297 operated by extension of the piston rod 186 to its fully extended position will effect operation of the valve 193 to reverse the travel of the pusher plate 23. As the piston rod 186 moves on its return stroke, the associated slip sheet remover 195 will engage and remove the slip sheet from the ream.

At the end of the return stroke of the pusher 23, the piston rod 186 will operate a switch 298. This will effect operation of the associated valve 299, to supply fluid under pressure to the head end of the associated cylinder 104 and raise the elevators 21 or 22 to a second position. The valve 193 will then be actuated to effect operation of the pusher plate 23 and effect the discharge of a second ream onto an associated magazine 25. As the reams pass along the magazine 25, the end ream will contact the switch 299a. This will effect operation of the valve 276 to operate the ejector motor 256 in a direction to move the ejectors 27 to eject a ream of paper from each magazine against the stops 29 into position to be pushed onto the conveyor 31 by the pushers 30. As the reams engage the stops 29, a switch 300 will be actuated to effect operation of the valve 288 to operate the motor 277 in a direction to push the ream onto the conveyor 31. A switch 301 in series with the switch 300 is engaged by flights 302 of the conveyor 31, for synchronizing the ejection of the reams onto the conveyor in the spaces between the flights thereof. A switch 303 effects operation of the valve 288 to reverse the direction of rotation of the motor 277 and return the pushers 30 to the positions shown in FIGURE 25. This switch will also effect return movement of the ejectors 27.

As one block of paper is pushed onto the elevator 21 by the transfer car 20, said transfer car will remain in the position shown in FIGURES 1 and 25 until a second block of paper engages the switch 99. This will effect a reversal in the direction of operation of the motor 167 under the control of suitable switches (not shown) and cause the transfer car to travel toward the elevator 22, to push a block of paper thereonto. This block of paper will then be split as previously described and discharged onto the conveyor 31.

The straightening, inverting and discharge operations of the blocks of paper effected by operation of the wheel 15, together with the transferring and ream splitting operations may be substantially continuous operations, a supply of paper always being in the wheel 15 and the paper ejected from the wheel being alternately transferred to one elevator or the other and split into reams of uniform size.

It should here be understood that while certain control switches are shown in the drawings and mentioned in the specification, that the switches are shown for illustrative purposes only and that the location and arrangement of said switches and the electrical connections to said switches and wiring to the various valves, for controlling operation of the various valves in the proper sequence, may be of various well known forms and are no part of the present invention, so are not herein shown or described further.

While I have herein shown and described one form in which my invention may be embodied, it should be understood that various modifications and variations in the invention may be attained without departing from the spirit and scope of the novel concepts thereof as defined by the claims appended hereto.

I claim as my invention:

1. In a machine for handling blocks of paper and the like, a wheel mounted for rotation about a horizontal axis and having a plurality of chordally extending pockets therein opening to the periphery thereof and spaced substantially 90° apart, power means for rotatably driving said wheel step by step to index said wheel to accommodate the pushing of paper into one pocket, index a next advance pocket into a vertical position to jog and straighten a block of paper therein, and indexing a third pocket into a horizontal discharge position, each pocket having a back wall guided for rectilinear movement outwardly of said pocket and forming an ejector therefor, power means for rectilinearly moving said back walls including individual driven members journaled in said wheel for rotation about axes parallel to the axis of rotation thereof, drive connections between said driven members and said ejectors, said driven members projecting outwardly of said wheel and having arcuate tongues on the outer ends thereof, a common drive member for successive of said tongues located in position to successively drive said tongues when the associated pockets are in discharge positions, said drive member including a socket conforming generally to said tongues and opening to the end and each side thereof, and cam and follower means camming said tongues to come into driving engagement with said socket when the associated pocket is in a horizontal discharge position.

2. In a machine for handling blocks of paper, a wheel mounted for rotation about a horizontal axis and having a plurality of pockets therein opening to the periphery thereof and spaced 90° apart, power means for rotatably driving said wheel step by step for successively indexing said wheel into position to accommodate the pushing of a block of paper into an empty pocket, index a next advance pocket into a vertical position to straighten a block of paper therein, and index a third pocket into a horizontal discharge position, each pocket having parallel vanes and a back wall movable therealong to eject a block of paper therefrom, one of said vanes being adjustably movable toward the other to accommodate adjustment of the pocket for varying thicknesses of paper, and common adjustment means for simultaneously adjustably moving said vanes and for holding said vanes in adjusted relation with respect to each other.

3. In a machine for handling blocks of paper, a wheel mounted for rotation about a horizontal axis and having a plurality of pockets therein opening to the periphery thereof and spaced 90° apart, power means for rotatably driving said wheel step by step for successively indexing said wheel into position to accommodate the pushing of a block of paper into an empty pocket, index a next advance pocket into a vertical position to straighten a block of paper therein, and to index a third pocket into a horizontal discharge position, each pocket having parallel vanes and a back wall movable therealong to eject a block of paper therefrom, one of said vanes being adjustably movable toward the other to accommodate adjustment of the pocket for varying thicknesses of paper, and common adjustment means for simultaneously adjustably moving said vanes and for holding said vanes in adjusted relation with respect to each other, comprising individual racks connected with the movable of said vanes, pinions meshing with said racks, and common drive means for rotating said pinions together.

4. In a machine for handling blocks of paper and the like, a wheel rotatable about a horizontal axis and having a plurality of chordally extending pockets therein opening to the periphery thereof and spaced substantially 90° apart, power means for rotatably driving said wheel step by step for indexing said wheel into position to bring an empty pocket into a paper receiving position, a next advance full pocket into a vertical paper straightening position to jog and straighten a block of paper therein, and a third pocket having a straightened block of paper therein into a horizontal discharge position, each pocket having parallel stationary and movable vanes and having an ejector guided for movement along said vanes and forming a back wall for the associated pocket, power means for driving said ejectors in ejecting and return directions only when an associated pocket is in a discharge position, adjustment means for the movable of said vanes for retaining said movable vanes in position and adjustably moving said vanes to accommodate the pockets to handle blocks of paper of different thicknesses, and common drive means for said adjustment means for adjustably moving the movable of said vanes together.

5. In a machine for handling blocks of paper and the like, a wheel rotatable about a horizontal axis and having a plurality of blocks of paper therein spaced substantially 90° apart, pusher means for successively pushing blocks of cut paper having horizontally extending stacked sheets into the pockets in horizontal receiving positions, means for rotatably driving said wheel step by step to bring an empty pocket into a horizontal receiving position in registry with said pusher means, to bring a next succeeding pocket into a horizontal position to jog and straighten a block of paper therein and to bring a third pocket into a horizontal discharge position to invert the block of paper therein, individual ejector means for each pocket, and drive means for said ejector means including a drive member having drive connection with said ejector means only when a pocket is in a horizontal discharge position, said drive member having a drive socket extending thereacross and opening to the end and to each side thereof, a tongue rotatably mounted in said wheel, means driven by rotatable movement of said tongue for operating said ejector means, and means for bringing said tongue into engagement with said socket to be driven thereby upon rotation of the wheel to bring an associated pocket into a horizontal discharge position.

6. In a machine for handling blocks of paper, a wheel mounted for rotation about a horizontal axis and having a plurality of pockets therein opening to the periphery thereof and spaced substantially 90° apart, means for rotatably driving said wheel step by step to successively bring said wheel into position to accommodate the pushing of a block of paper having horizontally extending stacked sheets into an empty horizontally extending pocket, to bring a next advance pocket into a vertical position to jog and straighten the block of paper therein, and to bring a third pocket into a horizontal discharge position to invert the straightened block of paper therein, an individual ejector associated with each pocket, a common drive member spaced from said wheel and extending parallel to the axis of rotation thereof, a separate driven member for each ejector rotatably journalled in said wheel, individual drive connections from said driven members to said ejectors, the drive connections between said drive member and said driven members including a socket on one member opening to the end and to opposite sides thereof and a tongue on the other member engageable with said socket, and cam and follower means maintaining said tongue and socket into position to have interengagement with each other as a pocket moves into a horizontal discharge position.

7. In a machine for handling blocks of cut-size paper and the like, a wheel rotatable about a horizontal axis and having a plurality of pockets therein opening to the periphery thereof, horizontally movable pusher means for successively pushing blocks of cut-size paper having the sheets thereof extending horizontally into the pockets positioned in horizontal receiving positions, a motor, means driven by said motor for rotatably driving said wheel step by step to bring an empty pocket into a horizontal receiving position in registry with said pusher means, to bring a full pocket into a vertical position to jog and straighten the block of paper therein, and to bring a third full pocket into a horizontal discharge position to invert the block of paper therein, an individual ejector forming the back of each pocket, said ejectors being mounted in said wheel for movement along the associated pockets towards and from the outer ends thereof, and drive means for said ejectors for driving an ejector associated with a pocket in a horizontal discharge position, only when said pocket is in a horizontal discharge position.

8. In a machine for handling blocks of cut-size paper, a wheel rotatable about a horizontal axis and having a plurality of pockets therein opening to the periphery thereof, means for rotatably driving said wheel step by step to successively bring said wheel into a position to accommodate the pushing of a block of paper having horizontally extending stacked sheets into an empty pocket in a horizontal receiving position, to bring a next advance full pocket into a vertical position to straighten the block of paper therein, and to bring a third pocket into a horizontal discharge position to invert the block of paper and position the paper for further treatment, and individual ejector forming the back of each pocket and movable therealong towards and from the periphery of said wheel, a common drive member for each ejector separate from said wheel and rotatable about a horizontal axis parallel to the axis of said wheel, and an individual driven member for each ejector having driving connection with an associated ejector and tongue and socket driving connections between said drive member and successive of said driven members operable only when an associated pocket is in a horizontal discharge position.

9. In a machine for straightening and inverting trimmed blocks of paper and the like, a wheel mounted for rotation about a horizontal axis and having a plurality of cut-size paper block receiving pockets therein opening to the periphery thereof and extending chordally therealong, means for rotatably driving said wheel in steps to index an empty pocket into a horizontal receiving position, a full pocket into a vertically extending paper straightening position and a vertically extending pocket into a horizontal discharge position, an individual ejector forming the back of each pocket and mounted in said wheel for movement toward and from the outer end of said pocket, and means separate from said wheel and having successive driving connection with an associated ejector for operating one of said ejectors for each step of rotatable movement of said wheel and only operating the ejector for a pocket in horizontal discharge position, to discharge an inverted straightened block of paper from the pocket.

References Cited in the file of this patent

UNITED STATES PATENTS

| | | |
|---|---|---|
| 1,090,473 | Gullberg et al. | Mar. 17, 1914 |
| 1,309,935 | Calleson | July 15, 1919 |
| 1,681,445 | Taliaferro | Aug. 21, 1928 |
| 2,429,496 | Sutter | Oct. 21, 1947 |
| 2,729,344 | Birchall | Jan. 3, 1956 |
| 2,765,931 | Kraus et al. | Oct. 9, 1956 |
| 2,815,249 | Curtenius | Dec. 3, 1957 |
| 2,834,500 | Jackson | May 13, 1958 |
| 2,852,123 | Heidergott | Sept. 16, 1958 |
| 2,918,133 | Peterson et al. | Dec. 22, 1959 |
| 2,936,493 | Scherer | May 17, 1960 |